Patented July 15, 1930

1,770,508

UNITED STATES PATENT OFFICE

HENRY C. BIGGE AND PERCY G. PARIS, OF BETHLEHEM, PENNSYLVANIA, ASSIGNORS TO BETHLEHEM STEEL COMPANY

MANUFACTURE OF STEEL ALLOYS

No Drawing. Application filed January 6, 1925. Serial No. 809.

Our invention relates to a duplex process of manufacturing alloy steels, which comprises reducing ore of the alloying metal in a furnace, an excess of reducing agent being employed, which excess enters the reduced metal; transferring the reduction product to a second furnace for refining, which refining comprises the addition of an excess of ore whereby excess reducing agent in the metal is decreased; running off most of the refined metal, leaving the slag, which contains the excess ore, in the furnace; adding ore and an excess of reducing agent to obtain a product similar to that first obtained in the first furnace; and then transferring this reduction product to the first furnace for refining. The significant feature of our invention is the carrying out of the two steps of the process, that is the reduction and the refining, in two furnaces in such manner that the refining in one furnace is followed by a reduction in the same furnace with a slag resulting from the refining operation, the two furnaces being alternately employed in this manner: a refining operation in one furnace followed by a reduction in the same furnace to produce a product which is refined in the other furnace followed by a reduction in that furnace and so on, the second furnace, being therein diluted with a suitable quantity of low carbon steel scrap, which has already been melted in this second furnace and a final addition of chrome ore in excess of the actual requirements is made to the bath for the removal of the silicon and the carbon. At the completion of the heat, the major portion of the low carbon, low silicon chromium steel bath is tapped off to a ladle, the remainder, together with its supernatant chromiferous slag, is retained in the electric furnace and is utilized as a fusion bath for a subsequent charge of chrome ore and silicon reducer. From this, it is evident that the refining furnace for one charge becomes the reduction furnace for the succeeding charge, the product of said reduction furnace being then transferred to the first named furnace, (previously used for the reduction step) for the final alloying and refining operations. In this manner both furnaces may be constantly utilized in the most efficient manner and their residual heat after tapping the charges may be used effectively. The addition of an oxidizing agent in nominal quantities, more than sufficient to effect the desired removal of impurities renders said additions independent of analysis, while the uncombined excess present in the slag is applied to useful purpose for subsequent reduction without the transfer thereof to another furnace and the consequent loss of heat and material. The conservation of furnace heat after tapping is largely aided by the residual bath left in the furnace; this residual bath, moreover, acts as a medium or carrier for the slag, which would otherwise adhere to the walls and bottom of the furnace and cause trouble in subsequent heats. It is also evident that by retaining in the furnace a portion of the bath in surface contact with the slag, there is very little possibility of slag inclusion in the poured metal.

Having thus described the invention what we claim as new and desire to secure by Letters Patent, is:

1. An improvement in the manufacture of steel alloys which consists in reducing an ore of the alloying element, melting steel scrap, allowing the reduction product with the steel scrap, and oxidizing the undesired residual impurities in the alloyed steel with additional ore in excess of their requirements, said operations being performed successively in two electric furnaces. a furnace for reduction and a furnace for alloying and refining, the reduction furnace for one charge performing the function of a refining furnace for the subsequent charge, while the refining furnace for the former performs the functions of a reduction furnace for the latter, whereby the excess ore remaining in the slag of one refining operation is conserved in the furnace for subsequent reduction with another charge.

2. An improvement in a duplex process for the manufacture of steel alloys which consists in reducing an ore containing the alloying element with an excess of a reducing agent in an electric furnace, whereby said excess is substantially introduced into the reduction product, discarding the reduction slag, adding the reduction product to a molten charge of refined steel in a second electric furnace, adding thereto a further charge of the ore in excess of that required to oxidize the undesired silicon and carbon contained therein, tapping a major portion of the refined steel alloy from the furnace, retaining the remaining portion thereof and the supernatant slag in the furnace to serve as the initial charge for a subsequent reduction stage, and transferring the product of said subsequent reduction to a molten bath of refined steel prepared in the first mentioned electric furnace.

3. An improvement in the manufacture of chromium steels low in carbon and in silicon, which consists in reducing chrome ore in an electric furnace with an excess of ferrosilicon, so as to obtain a ferro-chromium alloy containing a substantial proportion of silicon, discarding the reduction slag, transferring the reduction product to a second furnace containing a charge of molten low carbon steel scrap, adding thereto chrome ore to oxidize the undesired residual silicon present in the alloyed steel, the chrome ore of said addition being in substantial excess of that required for oxidation, removing the major portion of the refined steel alloy for pouring into molds, and retaining in the furnace the remainder of the bath with its supernatant chromiferous slag to form an initial fusion bath for a succeeding reduction charge.

4. A process for the manufacture of chrome steel alloys which consists in reducing sufficient chrome ore with ferrosilicon in moderate excess of reduction requirements, so as to obtain therefrom the major portion of the chromium desired in the steel, separately preparing a bath of low carbon steel, combining the latter with the reduction product and oxidizing the undesired residual silicon in the alloyed steel by the addition of chrome ore in moderate excess of the residual silicon requirement, said operations being performed in two electric furnaces successively, alternating in successive heats for the reduction stage and for the alloying and refining stage respectively, whereby the excess chrome ore remaining in the slag of the refining stage may be conserved for addition to the chrome ore charge of a subsequent reduction heat.

In testimony whereof I hereunto affix my signature this 22nd day of December, 1924.
HENRY C. BIGGE.

In testimony whereof I hereunto affix my signature this 22nd day of December 1924.
PERCY G. PARIS.